United States Patent [19]

Grantham et al.

[11] 4,415,948
[45] Nov. 15, 1983

[54] ELECTROSTATIC BONDED, SILICON CAPACITIVE PRESSURE TRANSDUCER

[75] Inventors: Daniel H. Grantham, Glastonbury; James L. Swindal, East Hampton, both of Conn.

[73] Assignee: United Technologies Corporation, Hartford, Conn.

[21] Appl. No.: 310,597

[22] Filed: Oct. 13, 1981

[51] Int. Cl.³ .............................................. H01G 7/00
[52] U.S. Cl. .................................. 361/283; 29/25.41; 29/25.42; 357/26
[58] Field of Search ........................ 361/283; 357/26; 73/718, 724; 29/25.41, 25.42, 585

[56] References Cited

U.S. PATENT DOCUMENTS

| 3,634,727 | 1/1972 | Polye | 357/14 |
| 4,016,644 | 4/1977 | Kurtz | 29/585 |
| 4,092,696 | 5/1978 | Boesen et al. | 361/283 |

Primary Examiner—B. A. Reynolds
Assistant Examiner—Alfred S. Keve
Attorney, Agent, or Firm—M. P. Williams

[57] ABSTRACT

A plurality of silicon pressure transducers 10 are formed by processing two conductive silicon wafers 11, 14, one of the wafers including a layer of borosilicate glass 32, a thin portion of which 17 is on the surface 12 of one of the plates of a capacitor formed by field-assisted bonding together of the two wafers, the thin layer of borosilicate glass avoiding arcing during the field-assisted bonding process.

2 Claims, 8 Drawing Figures

ELECTROSTATIC BONDED, SILICON CAPACITIVE PRESSURE TRANSDUCER

TECHNICAL FIELD

This invention relates to cavitied, capacitive pressure transducers formed of two silicon members joined together by sputtered borosilicate glass by means of field-assisted thermal bonding.

BACKGROUND ART

A substantially all-silicon capacitance-type pressure transducer is described in U.S. Pat. No. 3,634,727. That device is formed of two disks of silicon hollowed centrally, coated with insulating oxide, and then joined together either by metallizing the oxides followed by brazing, or simply with low melting temperature glass. Such device is on the order of 1" diameter and inherently has a relatively high ratio of unwanted static parasitic capacitance to variable capacitance as a function of pressure.

The method of bonding the two silicon disks together in the aforementioned patent is complex and costly. Additionally, the device of the aforementioned patent requires the processing of two wafers to provide only a single capacitive pressure transducer. Obviously, the utilization of low cost silicon pressure transducers dictates the need to fabricate them utilizing mass production techniques. For instance, processing a pair of larger wafers to make a significant number of smaller capacitors (on the order of one-half cm in the largest dimension) could significantly reduce the cost. However, the assurance of a complete seal between the two portions of each of the transducers formed on a wafer is mandatory.

A better method of forming silicon-to-silicon seals utilizes sputtered borosilicate glass. The glassed silicon portions are attracted to each other by a DC field in a vacuum, at a temperature on the order of 500° C. This is disclosed in NASA Tech Brief B74-10263, January 1975, entitled "Low Temperature Electrostatic Silicon-To-Silicon Seals Using Sputtered Borosilicate Glass".

The advantage of using silicon as the base material for cavitied, capacitive pressure transducers is because it allows external electrical connection to internal capacitor plate surfaces, without requiring complex mechanical structure. Coupled with well known microcircuit technology for processing silicon, and the field-assisted bonding technique of the NASA Tech Brief, the opportunity for mass production of extremely small, sensitive, capacitive pressure transducers, in a highly reproducible fashion, becomes apparent. However, when capacitive transducers are on the order of a half cm in their largest dimensions, the capacitance is very small unless the two capacitive plates are extremely close together. The closeness of the two capacitive plates has been found to interfere with the use of field-assisted bonding in making extremely small, silicon capacitive pressure transducers.

DESCRIPTION OF INVENTION

Objects of the invention include improvements in extremely small silicon capacitive pressure transducers, and improvements in methods for making such transducers on a large production scale, utilizing known microcircuit and thin film technology.

This invention is predicated on our discovery that surface imperfections in one or both of the silicon pieces being joined by field-associated bonding provide field concentrations that favor arcing, which results in short circuiting of the field and therefore results in nonuniform sealing of the two pieces of silicon to the borosilicate layer therebetween.

According to the present invention, capacitive pressure transducers consisting of a cavity formed by two elements of doped silicon, joined together by borosilicate glass through a process of field-assisted bonding, are provided with a borosilicate glass coating across substantially the entire capacitive plate surface of at least one of the silicon pieces. In accordance with one aspect of the invention, a silicon-borosilicate glass-silicon pressure transducer includes borosilicate glass within the pressure responsive cavity to provide increased dielectric between the plates of the capacitor. In accordance with another aspect of the present invention, the method of forming a silicon pressure transducer utilizing two pieces of silicon joined together by borosilicate glass through field-assisted bonding includes the step of dielectrically isolating one of the pieces of silicon from the other with borosilicate glass, thereby to avoid short circuiting of the field during the bonding process.

The invention makes it possible to formulate silicon-silicon capacitive pressure transducers having very close spacing of the resultant capacitor plates, without incurring difficulties in utilization of field-assisted bonding in the manufacture thereof.

Although not fully understood at this time, it is believed that the principal advantageous mechanism in the invention is the improved dielectric property of borosilicate glass (about 4.2), in contrast with that of the vacuum (about 1.0) which exists between the two silicon pieces. Further, it is believed possible that the high dielectric constant of the borosilicate glass on the silicon surface as the last step prior to field-assisted bonding tends to disperse the field at sharp surfaces somewhat, thereby to reduce the field concentration at sharp, localized points.

The invention may be practiced, in the light of the teachings which follow hereinafter, utilizing thin film and microcircuit processing techniques which are well within the skill of the art. The foregoing and other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
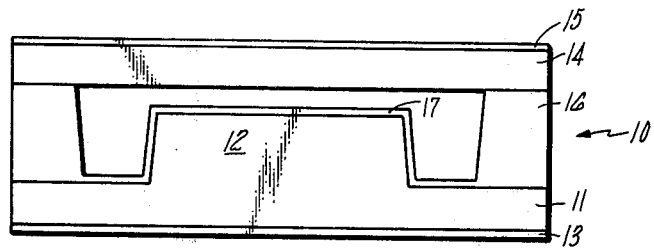
FIGS. 1-3 are simplified, side elevation, sectioned views of exemplary silicon-glass-silicon capacitive pressure transducers formed by and embodying the present invention.

Referring now to FIG. 1, a silicon-glass-silicon capacitive pressure transducer 10 is formed of a silicon substrate 11 having a circular pedestal 12 formed therein, the substrate 11 having a metallic lower surface 13 which may consist of thin layers of nickel and gold (as described more fully with respect to FIGS. 4-8 hereinafter) that permit wire bonding of electrical connection leads thereto. The upper surface of the pedestal 12 forms one plate of a capacitor, the other plate of which is the lower surface of a silicon piece 14. The upper surface of the silicon piece 14 has metallic layers 15 similar to the layers 13. The two silicon pieces 11, 14 are spaced apart and joined together by borosilicate glass 16 which is deposited and etched in steps (described hereinafter) so as to provide the desired spacing between the capacitive plate surfaces formed by the portions 12 and 14, and to provide dielectric 17 across the pedestal 12 so as to avoid arcing between the pedestal 12 and the piece 14 during field-assisted bonding. In the manufacture of the transducer 10, all of the topological processing is provided on a wafer including the piece 12, and a wafer including the piece 14 is provided only with metallization 15. And, the formation of the borosilicate glass layer 16, 17 over the entire silicon piece 11, including the pedestal 12, is achieved during the topological processing of the wafer including the silicon 11. The metallization 13, 15 may be deposited after the two wafers are joined, by field-assisted bonding, utilizing RF sputtering or either electron beam or resistive evaporation, in accordance with well known techniques.

Figure 2:
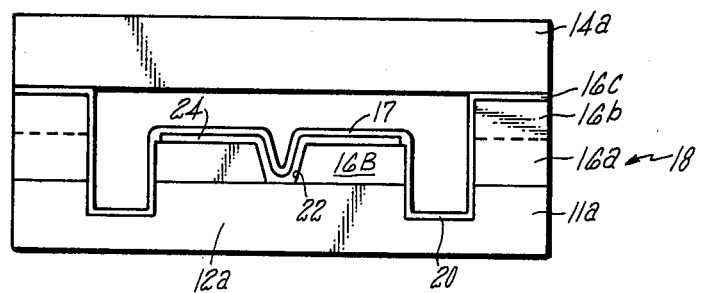

Referring now to FIG. 2, a somewhat different pressure transducer 18 is formed of a piece of silicon 11a which has an annular moat 20 etched therein so as to define a circular pedestal 12a, upon which there is deposited borosilicate glass 16a which defines the separation between capacitor plates. Additional borosilicate glass 16b defines the spacing between silicon pieces 11a and 14a and is etched out to provide a hole 22 through which a thin film of metal 24 may make contact to the pedestal 12a. The borosilicate glass layer 16c may be sputtered onto the silicon or onto the metal to avoid arcing during field-assisted bonding in accordance with the invention. The use of borosilicate glass 16a, 16b together with the etched moat 20 in the silicon piece 11a provides an improvement in dimensional control as is disclosed and claimed in a commonly owned, copending U.S. patent application entitled SILICON-GLASS-SILICON CAPACITIVE PRESSURE TRANSDUCER, Ser. No. 310,598, filed on even date herewith by Swindal and Grantham.

Figure 3:
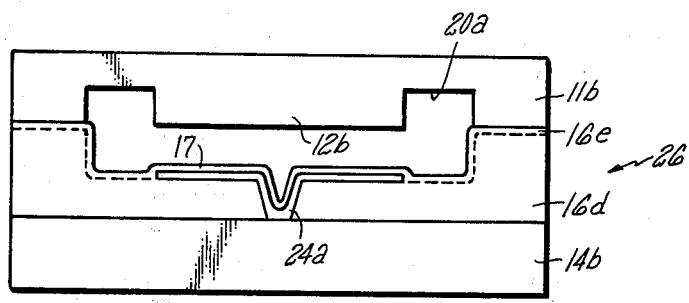

An alternative embodiment of the present invention, as applied to a transducer 26 of the aforementioned Swindal et al. U.S. patent application, is illustrated in FIG. 3. Therein, two wafers receive topological processing, a first wafer 11b having a moat 20a etched therein so as to provide a circular pedestal 12b, in a fashion similar to that described with respect to the silicon piece 11a. On the other hand, another wafer, including silicon piece 14b is provided with sputtered borosilicate glass 16d, shaped to provide dimensional control as described in the aforementioned copending application, a thin metal film 24a to provide a capacitive plate electrically connected to the silicon piece 14b and sputtered borosilicate glass 16e to provide the dielectric isolation in accordance with the present invention. Formation of the pressure transducer 26 is unlike formation of the pressure transducers 10 and 18 since it requires topological processing of two wafers and registration of the two wafers before joining by field-assisted bonding. On the other hand, formation of the pressure transducer 26 is similar to formation of the pressure transducer 10 in that the borosilicate glass is all provided on the same wafer.

The transducers 18, 26 may have metallization on the opposite external surfaces thereof to permit wire bonding of electrical connections thereto, which, however, has not been shown for simplicity.

Figure 4:
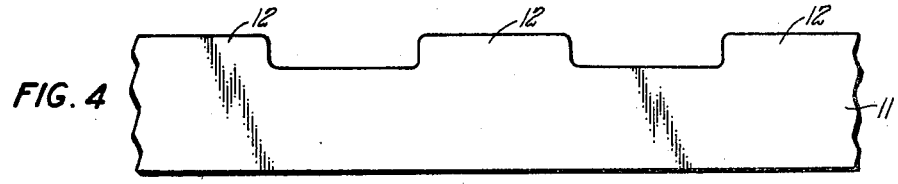
FIGS. 4-8 are sectioned side elevation views of silicon wafers being processed in the manufacture of the exemplary pressure transducer of FIG. 1.

A method of forming a capacitive transducer in accordance with the invention is illustrated in FIGS. 4-8. In FIG. 4, a wafer 11 of doped silicon, which may be either N type of P type, doped to a level of at least $10^{15}$ impurity per cubic centimeter with phosphorous, arsenic or the like, may have a resistivity on the order of one third ohm centimeter, and be on the order of 300–400 microns thick. Using well known masking, photoresist and etching techniques, the wafer 11 is etched away so as to create a plurality of pedestals, one for each device being made in the wafer, which are on the order of 6 micron in height. The diameter of each pedestal 12 may be on the order of one-half centimeter, or so. The pedestals 12 may be separated by on the order of a third of a centimeter.

Figure 5:
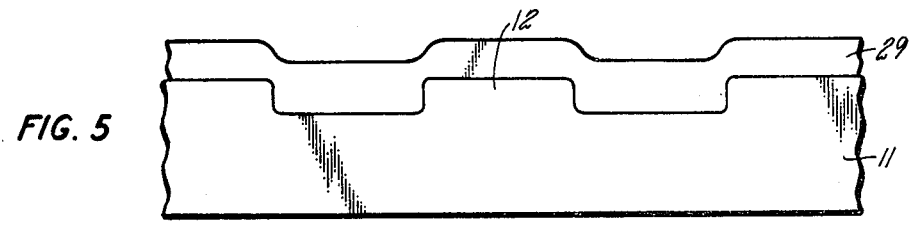
Figure 6:
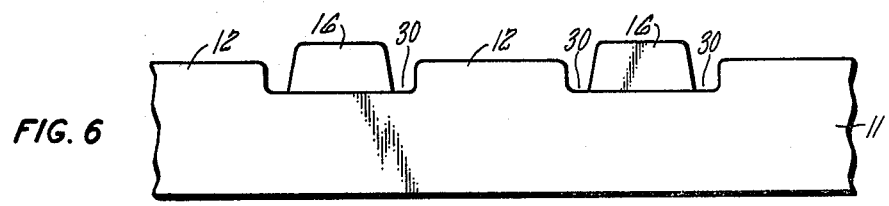
Figure 7:
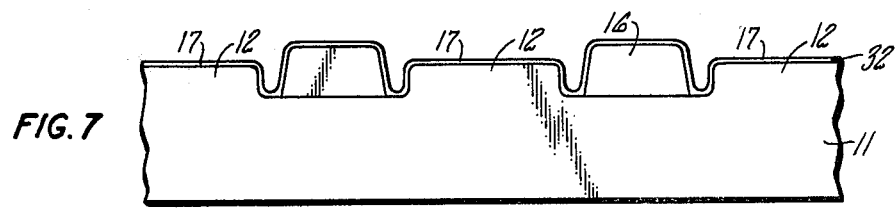

In the next step illustrated in FIG. 5, a layer of borosilicate glass 29 is sputtered onto the wafer 11 to a depth of on the order of 8 or 9 microns. Then, in the next step illustrated in FIG. 6, the borosilicate glass 29 is etched away so as to retain a lattice structure 16 defining moats 30 surrounding each of the pedestals 12 in the wafer 11. The etching of FIG. 6 is readily attained since the silicon acts as an etch stop for borosilicate glass etchants (such as hydrofluoric acid).

In step 7, an additional layer of borosilicate glass 32 is sputtered onto the surface of the wafer 28 and the borosilicate glass matrix 16, in accordance with the present invention, to provide dielectric 17 over the pedestals 12. Since dimensional control is provided by the sputtering of the layer 29 (FIG. 5) with etching back to silicon (FIG. 6) a layer 32 may simply be sputtered to the desired dimension, on the order of ½ micron, without any further etching.

Figure 8:
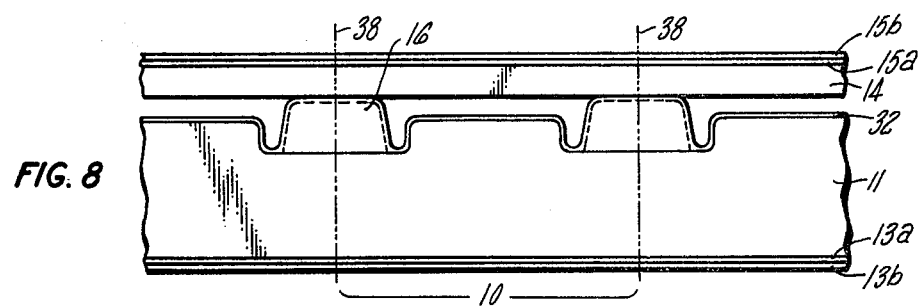

FIG. 8 illustrates the remaining steps in forming the capacitive pressure transducer 10. A second wafer 14 may be prepared, by suitably lapping to a desired thickness, such as on the order of 200 microns, so as to form a flexible diaphragm. Then wafer 14 is brought into proximity with the wafer 11, with only gross alignment required, following which the two wafers may be heated to on the order of 500° C. in a vacuum chamber, evacuated to about $10^{-6}$ Torr pressure, and a DC voltage on the order of 75-125 volts is applied from the wafer 14 (+) to the wafer 11 (−) for on the order of 5–10 minutes. As is known, the electrostatic field causes the two wafers to attract each other as the heat provides a seal of the evacuated chambers formed around each pedestal 12. The wafers 11, 14 may have metallization 13, 15 deposited thereon. For instance, a first layer 13a, 15a on the order of 500 angstroms of nickel may be deposited due to its affinity to silicon, followed by a second layer 13b, 15b of about 5,000 angstroms of gold to provide a suitable surface for wire bonding electrical connection leads. Then the bonded wafers 11, 14 may be diced (such as by sawing), as illustrated by the dotted lines 38, to form individual pressure transducers 10 of the type illustrated in FIG. 1. If the metallization is Al, Cr, or Ni alone, it could be deposited before the bonding step. But, the bonding is achieved at a temperature above the gold-silicon eutectic temperature (and the nickel does not isolate them), so gold must be deposited after bonding.

A capacitive transducer 10 formed of N-type single crystal silicon, doped with approximately $10^{18}$ atoms of phosphorous per cc, having dimensions substantially as described hereinbefore, has been found to have a capacitance which varies from a nominal static capacitance at zero psia to a capacitance at about 15 psia which is about 8% greater than the nominal (zero pressure, static) capacitance. Of course, the two wafers 11, 14 need not be of the same conductivity type nor contain the same dopant since there is no molecular interaction therebetween. One type of borosilicate glass which has been useful in fabricating capacitive transducers of the type described herein is available in the market under the designation Corning 7070. However, other glasses may be found to be useful, some examples of which are described by Guckel, et al., "Electromechanical Devices Utilizing Thin Si Diaphragms", Applied Physics Letters, Vol. 31, No. 9, Nov. 1, 1977.

In some utilizations of the present invention, it may be found desirable to have less than one entire surface of the vacuum cavity coated with borosilicate glass. In such a case, one could provide an additional etching step (following the deposition step of FIG. 7) to etch away the borosilicate glass which is within the moats 30 (FIG. 6), or to etch away the borosilicate glass not overlying the metallization 24a in the embodiment of FIG. 3. This may particularly be true where the borosilicate glass is on the silicon piece which forms the relatively movable "hinge" portion of a device (such as within the moat 20 in the embodiment of FIG. 2 if modified to have the borosilicate glass applied to the topologically-processed wafer 11). In any event, the invention is having the borosilicate glass between the operative portions of the two capacitive plates, since this is where the vacuum dielectric has the least dimension, and the likelihood of arcing is the greatest during the field-assisted bonding process. As can be seen by comparison of the embodiments of FIGS. 1-3, whether or not one (or both) of the capacitive plates is in fact formed of metal is irrelevant in the utilization of the present invention since the borosilicate glass can be deposited over a metal plate to provide the same advantage as when it is applied over one of the silicon plates. It should be obvious that borosilicate glass could be applied over both of the plates of the capacitor, in any case where it was found necessary or desirable to do so, without departing from the invention.

Similarly, although the invention has been shown and described with respect to exemplary embodiments thereof, it should be understood by those skilled in the art that the foregoing and various other changes, additions or omissions may be provided therein and thereto, without departing from the spirit and the scope of the invention.

We claim:

1. A method of forming a capacitive pressure sensor by field-assisted bonding of two pieces of silicon separated by borosilicate glass, to provide a pressure tight chamber including two closely-spaced surfaces having operative portions forming the respective plates of a pressure-variable capacitor, in which the improvement comprises depositing a thin layer of borosilicate glass on substantially the entire operative portion of the surface of one of said plates prior to application of the electrostatic field, thereby to avoid arcing between the plates and the commensurate short circuiting of the electrostatic field during the bonding process.

2. A silicon-glass-silicon capacitive pressure transducer comprising a pair of silicon pieces, at least one of said pieces shaped so as to provide a distinct conductive surface thereof on one of said silicon pieces adjacent a conductive surface disposed on the other of said pieces so as to define a pair of closely spaced conductive surfaces having operative portions forming the plates of a variable, pressure dependent capacitor, wherein the improvement comprises a thin layer of borosilicate glass disposed on substantially the entire operative portion of one of said surfaces.

* * * * *